Oct. 20, 1959  D. A. REILLY  2,909,388
VEHICLE CONVERSION UNIT
Filed Oct. 8, 1953  2 Sheets-Sheet 1
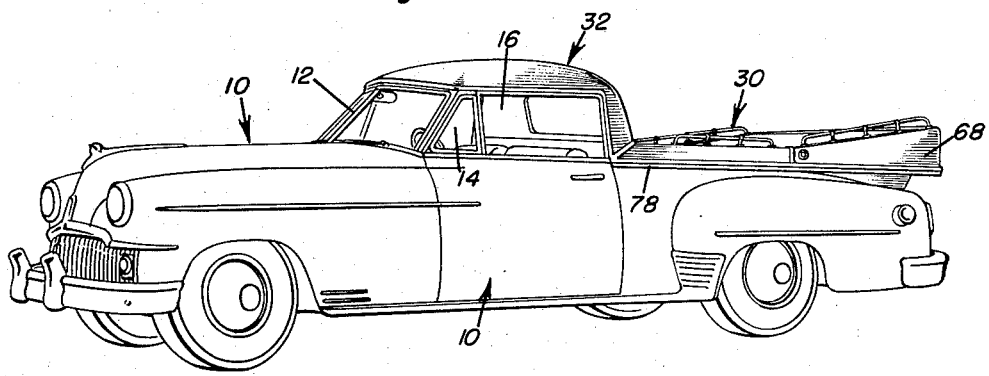
Fig.1
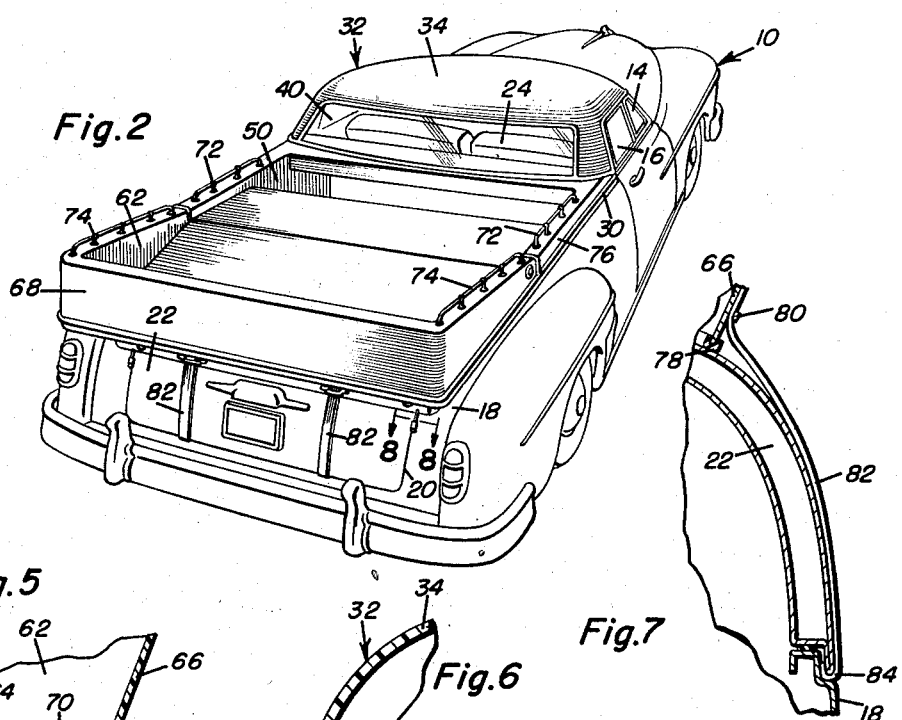
Fig.2
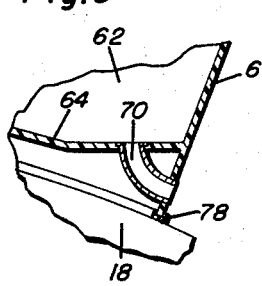
Fig.5
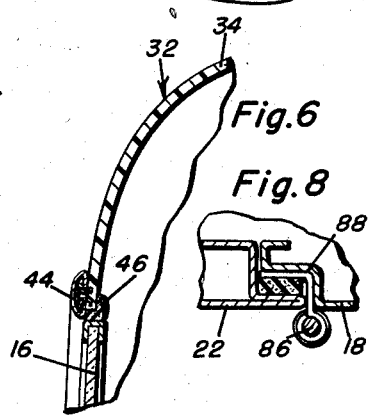
Fig.6
Fig.8
Fig.7
Daniel A. Reilly
INVENTOR.
BY *Clarence A. O'Brien*
*and Harvey B. Jacobson*
Attorneys Oct. 20, 1959     D. A. REILLY     2,909,388
VEHICLE CONVERSION UNIT
Filed Oct. 8, 1953     2 Sheets-Sheet 2
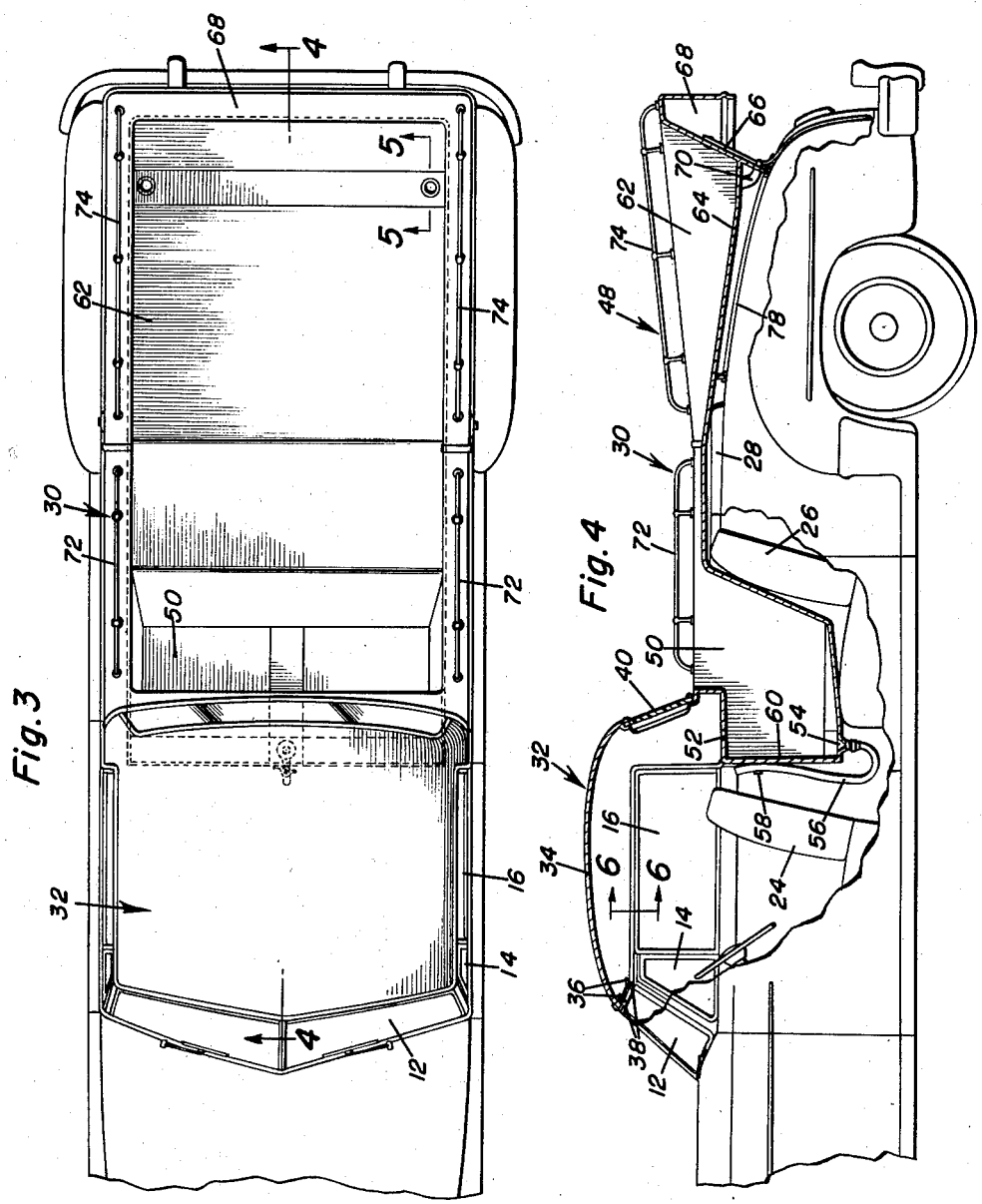
Daniel A. Reilly
INVENTOR.

United States Patent Office 2,909,388
Patented Oct. 20, 1959

2,909,388

VEHICLE CONVERSION UNIT

Daniel A. Reilly, Belmar, N.J.

Application October 8, 1953, Serial No. 384,922

2 Claims. (Cl. 296—21)

This invention relates in general to improvements in attachments for vehicles, and more specifically to a unit for converting a convertible-type vehicle into a flower car.

A primary object of this invention is to provide a novel vehicle conversion unit which may be attached to a convertible-type vehicle without making any changes whatsoever in such a vehicle so as to convert the same to a flower car for funeral purposes.

Another object of this invention is to provide an improved vehicle conversion unit which may be quickly and easily attached to and removed from a vehicle of the convertible type with a minimum of effort.

A further object of this invention is to provide a vehicle conversion unit having novel securing means so that the same may be quickly and easily attached to a vehicle of the convertible type through the utilization of elements already provided on the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front perspective view of a convertible-type vehicle having mounted thereon the vehicle conversion unit which is the subject of this invention;

Figure 2 is a rear perspective view of the vehicle of Figure 1;

Figure 3 is an enlarged fragmentary top plan view of the vehicle of Figure 1;

Figure 4 is a fragmentary vertical sectional view, taken substantially upon the plane indicated by the section line 4—4 of Figure 3 and shows the general cross-section of the vehicle conversion unit and its relationsihp to the convertible vehicle;

Figure 5 is an enlarged fragmentary sectional view, taken substantially upon the plane indicated by the section line 5—5 of Figure 3 and shows the construction at the rear of the conversion unit to facilitate the draining of one of the flower receptacles thereof;

Figure 6 is an enlarged fragmentary vertical sectional view taken substantially upon the plane indicated by the section line 6—6 of Figure 4 and shows the relationship between the cab portion of the conversion unit and a window of the convertible vehicle;

Figure 7 is an enlarged fragmentary sectional view taken through the trunk portion of the convertible vehicle and shows the manner in which straps are attached thereto for the securement of the rear portion of the conversion unit to the convertible vehicle; and Figure 8 is an enlarged fragmentary horizontal sectional view taken substantially upon the plane indicated by the section line 8—8 of Figure 2 and shows the manner in which additional securing straps are connected to the convertible vehicle.

Referring now to the drawings in detail, it will be seen that there is illustrated a conventional type of convertible vehicle which is referred to in general by the reference numeral 10. The vehicle 10 includes a windshield 12, front window panels 14, windows 16 and a rear deck 18. It will be understood that the rear deck 18 is provided with a trunk opening 20 which is normally closed by a trunk lid 22. Further, the vehicle 10 includes a front seat 24 and a rear seat 26. The vehicle 10 also includes all of the other numerous vehicle accessories and includes a convertible top 28 which is shown in Figure 4 in its collapsed position.

Removably secured to the vehicle 10 is the vehicle conversion unit which is the subject of this invention, the conversion unit being referred to in general by the reference numeral 30. The vehicle conversion unit 30 includes a cab portion which is referred to in general by the reference numeral 32. The cab portion 32 includes a roof 34 which is configurated to mate with the upper edge of the windshield 12. Further, the forward edge of the roof 34 is provided with suitable fasteners 36 which are engageable with fasteners 38 carried by the upper edge of the windshield 12 for securing the cab portion 32 to the windshield 12. It will be understood that the fasteners 36 are identical with the fasteners carried by the convertible top 28 and that they coact with the fasteners 38 carried by the windshield 12 in exactly the same manner as the fasteners of the convertible top 28. Inasmuch as these fasteners 36 and 38 are conventional, they are not explained in more detail.

It will be noted that the cab 32 is of a size to extend beyond the front seat 24 and terminates in partial overlying relation to the rear seat 26. The rear of the cab 32 is in the form of a relatively wide rear window 40. It will be noted that the cab 32 is so configurated along its sides as to have the same outline as the window panel 14 and the side windows 16 of the vehicle 10. As is best illustrated in Figure 6, the cab 32 is provided with an exterior molding 44 along the lower side edge thereof. Also the cab 32 is provided with a sealing strip 46 along the side edge, but disposed slightly interiorly thereof. As is best illustrated in Figure 6, each sealing strip 46 is shaped so as to overlie the tops of the associated window panel 14 and the side windows 16 and engage the rear edge of the side windows 16.

The conversion unit 30 also includes a flower receiving portion which is referred to in general by the reference numeral 48. The flower receiving unit 48 includes a first flower receptacle 50. The flower receptacle 50 is so configurated as to seat upon the seat portion of the rear seat 26 and engage in a back rest thereof. Further, the receptacle 50 is provided with a partial top wall 52 which forms the rear deck of the cab portion of the vehicle 10 when provided with the conversion unit 32.

It is intended that the flower receptacle 50 be filled with flowers which may be retained in their freshened state through the sprinkling of water thereon. In order to drain the flower receptacle 50 there is provided in the center thereof a convenient drain 54 to which is attached a hose 56. The hose 56 has its free end normally retained in an elevated position by a clip 58 carried by a front wall 60 of the flower receptacle 50. It will be noted that the hose 56 is disposed directly behind the front seat 24 and the flower receptacle 50 may be drained by releasing the free end of the hose 56 and passing it out of one of the doors of the vehicle 10.

The flower receiving portion 48 also includes a tonneau flower receptacle 62. The tonneau flower receptacle 62 is elongated and shallow and includes a bottom wall 64 and a rear wall 66. Also, there is an ornamental skirt 68 which depends at the upper rear of the rear wall 66. The rear wall 66 extends downwardly below the bottom wall 64 and has passing therethrough at opposite sides of the bottom wall 64 suitable drains 70 for draining the tonneau flower receptacle 62.

In order to retain the flowers carried by the vehicle 10 when converted into a flower car within the two receptacles 50 and 62, there is provided rails 72 and 74 along opposite sides of the conversion unit 30. The rails 72 retain flowers within the flower receptacle 50 whereas the rails 74 retain flowers within the flower receptacle 62.

It will be understood that the rear portion of the conversion unit 30 includes side walls 76 which conform at their lower edges to the general configuration of the associated portion of the vehicle including the curvature of the rear deck 18. Also, the lower edge of the rear wall 66 is configurated to conform to the transverse cross-section of the rear deck 18. The lower edges of the side walls of the flower receptacle 62 and the rear wall 66 are provided with a continuous sealing strip 78. The sealing strip 78 engages associated portions of the body of the vehicle 10 so as to both form a seal between the conversion unit 30 and the body and to cushion the conversion unit 30 so as to prevent scarring of the vehicle 10.

The rear end of the conversion unit 30 is retained in place on the vehicle 10 by a pair of transversely-spaced straps which have their upper ends rigidly secured to the rear wall 66 by spaced clamps 80. The straps, which are referred to by the reference numeral 82, are shaped to conform to the general curvature of the trunk lid 22 and are provided at their lower ends with hooks 84. It will be noted that the hooks 84 are disposed between the bottom edge of the trunk lid 22 and an associated portion of the trunk deck 18.

Referring now to Figures 2 and 8 in particular, it will be seen that depending from the rear wall 66 of the conversion unit 30 are short rods 86 which have pivotally connected thereto L-shaped clips 88. There is one rod 86 and one clip 88 disposed at each side of the trunk lid 22. The clips 88 have legs which underlie a lip of the trunk lid 22 and are retained in place between the lip of the trunk lid 22 and associated portions of the rear deck 18 in the manner best illustrated in Figure 8.

When it is desired to mount the convertible unit 30 on the vehicle 10, the convertible top 28 thereof is moved to its collapsed position, illustrated in Figure 4. Then the conversion unit 30, which is preferably formed of a lightweight material, such as plastic, is lifted into overlying relation to the vehicle 10. The cab 32 is first secured to the windshield 12 through the use of the fasteners 36 and 38. Then the trunk lid 22 is partially lifted to a slightly open position and the hooks 84 placed around the lower lip thereof and the clips 88 disposed beneath the side lip thereof. Then the trunk lid 22 is swung to a closed position tensioning the straps 82 and pulling the rear portion of the conversion unit 30 tightly down against the rear portion of the vehicle 10.

Inasmuch as the rear portion of the conversion unit 30 is tightly sealed with respect to the body of the vehicle 10 by the sealing strip 78 and since the cab 32 is tightly sealed to the forward portion of the vehicle 10 by its joint with the windshield 12 and through the use of the sealing strip 46, it will be seen that the converted vehicle 10 will be tight and therefore can be utilized both during the winter and summer. Further, it will be understood that the appearance of the converted vehicle 10, as is best illustrated in Figures 1 and 2 will be that of a specially designed flower car. However, when the conversion unit 30 is removed from the vehicle 10, it may be utilized as a conventional convertible vehicle either for pleasure or business, as desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A vehicle conversion unit for converting a convertible-type vehicle into a flower car, said conversion unit comprising an elongated body, said body including a forward cab portion for overlying and enclosing a front seat of the convertible-type vehicle, a rear flower carrying portion for overlying a rear seat and a trunk portion of the convertible-type vehicle, means carried by said body for retaining said body in place on the vehicle, said means including fastening means engageable with fastening means carried by a windshield of the convertible-type vehicle, and straps engageable between a trunk lid and an associated trunk opening of the vehicle, said straps having hook portions engageable with the trunk lid when the trunk lid is in an open position whereby said straps are tensioned by closing the trunk lid.

2. A vehicle conversion unit for converting a convertible type vehicle into a flower car, said conversion unit comprising an elongated body, said body including a forward cab portion for overlying and enclosing a front seat of the convertible type vehicle, a rear flower carrying portion for overlying a rear seat and a trunk portion of the convertible type vehicle, means carried by said body for retaining said body in place on the vehicle, said means including straps engageable between a trunk lid and an associated trunk opening of the vehicle, said straps having hook portions engageable with the trunk lid when the trunk lid is in an open position whereby said straps are tensioned by closing the trunk lid.

References Cited in the file of this patent

UNITED STATES PATENTS

| | | |
|---|---|---|
| 1,233,661 | Gordon | July 17, 1917 |
| 1,420,298 | White | June 20, 1922 |
| 1,984,681 | Jackson | Dec. 18, 1934 |
| 2,599,066 | Osborn | June 3, 1952 |
| 2,657,087 | Morris | Oct. 27, 1953 |